Jan. 4, 1966  R. SINKINSON  3,227,475
CONDUIT CONSTRUCTION
Filed May 22, 1963
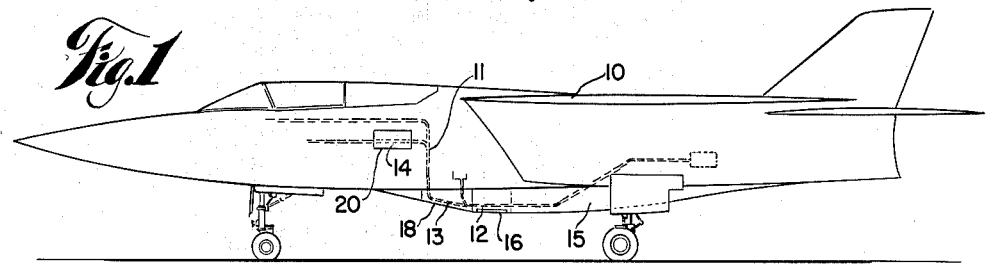
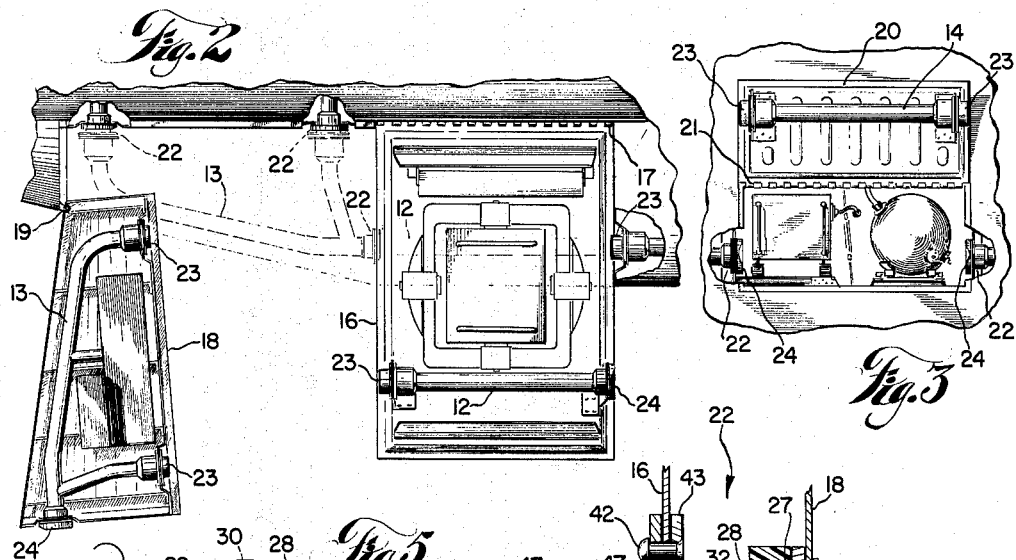
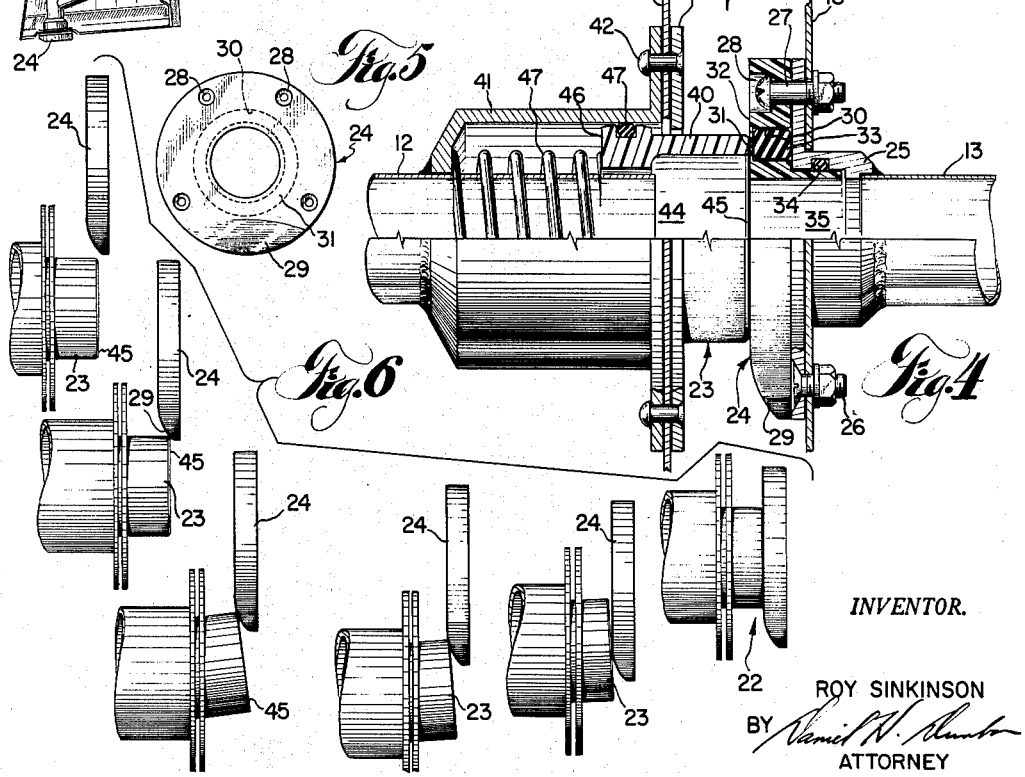
INVENTOR.
ROY SINKINSON
BY
ATTORNEY

United States Patent Office

3,227,475
Patented Jan. 4, 1966

3,227,475
CONDUIT CONSTRUCTION
Roy Sinkinson, Reynoldsburg, Ohio, assignor to
North American Aviation, Inc.
Filed May 22, 1963, Ser. No. 282,435
2 Claims. (Cl. 285—9)

This invention relates generally to aircraft, and specifically concerns a conduit construction for conducting air through particular interior aircraft regions.

It is a primary object of this invention to provide a conduit construction for aircraft which readily permits removal and reinstallation of one or more contained conduit sections.

Another object of this invention is to provide an aircraft conduit construction which permits ready access to adjacently installed equipment or to aircraft components otherwise normally obstructed by the conduit.

Another object of this invention is to provide an aircraft conduit construction having at least one readily removable and reinstallable conduit section with a capability for accommodating misalignment of that removable section component.

Another object of this invention is to provide an aircraft conduit construction having at least one readily removable and reinstallable conduit section with means for responding to flexing of adjacent aircraft structure.

A still further object of this invention is to provide an aircraft conduit construction having at least one readily removable and reinstallable conduit section with joints which effect minimum leakage rates for the construction.

Other objects and advantages of this invention will become apparent during a consideration of the drawings and description.

In the drawings:

FIG. 1 is an elevational view of an aircraft having the conduit construction of this invention incorporated therein;

FIG. 2 is an elevational view which illustrates embodiments of a readily removable conduit section used in the conduit construction of this invention;

FIG. 3 is an elevational view illustrating another embodiment of a readily removable conduit section used in the conduit construction of this invention;

FIG. 4 is a partial sectional view of a preferred joint included in the conduit construction of this invention;

FIG. 5 is an elevational view of the seal seat detailed incorporated in the joint illustrated in FIG. 4; and FIG. 6 illustrates the relative positioning of the conduit construction joint components during removal or replacement of the conduit construction removable section.

Considerable difficulty has been experienced in locating air-conducting conduits in aircraft so as to facilitate access to adjacently and more-interiorly installed equipment for servicing and maintenance. Also, in some instances difficulty has been experienced in conveniently routing such conduits through hinged or otherwise removable and reinstallable aircraft exterior sections. This invention overcomes such difficulties by utilizing a readily removable conduit section which is secured to a specific access panel door or the like that is normally removed and reinstalled (opened and closed) as a part of the servicing effort. Use of this invention eliminates the necessity of removing a rigidly-installed conduit section separately from the opening or closing of the access door.

FIG. 1 illustrates an aircraft 10 having a system 11 for conducting air to or from various interior regions of the aircraft. Such air may be utilized, for instance, for cooling electrical and electronic equipment carried aboard the aircraft. In the FIG. 1 arrangement, readily removable or separable conduit sections 12, 13, and 14 are illustrated as being included in the system. Conduit sections 12 and 13 are contained in separate hinged sections of the fairing 15 carried at the underside of the fuselage portion of aircraft 10. Conduit section 14 is illustrated as being located within the fuselage portion of aircraft 10.

In FIG. 2, conduit section 12 (which is a preferred embodiment of the removable conduit section employed in my invention) is shown in mounted relation to fairing section 16. One edge of section 16 is carried by the fuselage of aircraft 10 through the longitudinally-oriented hinge designated 17. A latch means for securing section 16 to aircraft structure in its closed (FIG. 1) condition is not shown. Conduit section 13 is carried by fairing section 18 and it in turn is supported by the fuselage of aircraft 10 through transversely-oriented hinge 19. The latch or fastener means required to secure fairing section 18 in its closed (FIG. 1) condition is not shown. FIG. 3 illustrates a readily removable and replaceable conduit section 14 in mounted relation to access door 20. Such access door is coupled to a structural portion of the aircraft fuselage by hinge 21. In the installation shown in FIG. 3, the readily removable conduit section is located adjacent more-interiorly installed aircraft equipment when the access door is in a closed position.

The conduit construction of this invention utilizes a novel and effective joint 22 at each interface between a removable conduit section and a fixed conduit section or another removable conduit section. Details of joint 22 are best disclosed in FIG. 4. As shown therein, one end of conduit section 12 is joined to an end of conduit section 13 in proper sealing relation. Basically, joint 22 is comprised of a piston seal 23 and a seal seat 24. Conduit section 13 is provided with a joined mounting flange designated 25. The flange (and the conduit section) are connected to a structural component of fairing section 18 by fasteners such as 26. Seal seat 24 is securely connected to the mounting flange and to structure 18 by fasteners 27, the heads of which are recessed in openings 28. Seat 24 is preferably fabricated of a durable but resilient material such as polytetrafluoroethylene and has at least two additional distinct feature. First, seat 24 is provided with a ramp (or lip) designated 29. In addition, the seat is provided with an underside groove 30 which is located and sized in depth to provide a thin web region 31 in seat face 32. A backup packing 33, which preferably is made of a vulcanized rubber, is located in groove 30 when the seal seat is assembled and provides resilient support for the seal face web region 31. An O-ring seal 34 is preferably incorporated in the seal seat to minimize leakage from the interior region 35 to the atmosphere by way of the interface between the seal seat and mounting flange 25. The interior 35 of seat 24 preferably corresponds to the interior of conduit 13 in size and shape.

The piston seal portion 23 of the joint illustrated in FIG. 4 is essentially contained within the mounting flange designated 41. Flange 41 is joined to conduit section 12 as by welding and is formed to provide a housing. Flange 41 (and the end of conduit section 12) is secured to a structural component of fairing section 16 by the fastener means designated 42. Fastener means 42 may in addition serve to secure retaining ring component 43 in proper position. It should be noted that hollow piston seal 23 includes an interior designated 44, an annular lip designated 45, and an enlarged base designated 46. Base 46 cooperates with retainer ring 43 to limit its position. In addition, a compression spring 47 is arranged to contact piston base 46 to urge seal 23 outwardly to the extent permitted by retainer ring 43 or to the extent permitted by seal engagement with seat 24. An O-ring seal 47 is provided to minimize leakage from the interior region of seal 23 to the atmosphere by way of the interface between base 46 and the interior surface of mounting flange 41. Piston seal 23 may also be fabricated of polytetrafluoroethylene.

FIG. 6 illustrates the relative positions of the joint portions detailed in FIG. 4 during their engagement in association with opening and closing of a hinged access door or the like. The extreme left hand position shows piston seal portion 23 and seal seat portion 24 prior to any engagement of the components. Immediately after initial contact is established between piston seal 23 and seal seat 24, the piston is caused to tilt or tip within the degree permitted by the piston configuration and retaining ring 43. The initial contact between piston seal 23 and seal seat 24 is at ramp 29. When the piston seal is brought into proper engagement with seat face 32, annular lip 45 contacts the inset web region 31. Backup packing 33 provides proper resilient support for web region 31 during engagement of the piston seal lip portion 45 and with seal seat 24. The cooperating surfaces of seal seat 24 and annular lip 45 are finished by conventional machining techniques to have a quality which minimizes joint leakage. In the case of a seal seat 24 and a piston seal 23 fabricated of polytetrafluoroethylene, machining to a surface roughness of 63 microinches R.M.S. has been found adequate to reduce air leakage to an acceptable level in at least one typical aircraft application.

In the design of the joint piston seal components, attention is given to generating pressure loadings on piston 23 which are in addition to the loadings caused by spring means 47. By establishing a differential in pressurized end areas of piston seal 23, I have been able to develop an additional force which materially aids in minimizing joint leakage. In the case of one actual embodiment of this invention, a one-quarter (¼) pound additional force on piston 23 has been developed using an internal conduit air pressure of 0.10 pound per square inch (gage). Use of such loading together with the surface finish qualities heretofore-described have produced unusually good results relating to seal leakage. For instance, a removable conduit section having an internal diameter of approximately 1.3″ and conducting air at a temperature of 225° F. and 30 pounds per square inch gage experienced leakage at a joint 22 of approximately 0.0001 pound per minute. In addition, the conduit construction was noted to perform equally well for appreciable angular misalignments of the major joint component. Applicant's evaluation has established that at least a misalignment of up to 2.5° may be tolerated as between conduit sections without adversely affecting the sealing ability of joint 22. Also, by over-sizing web section 31 relative to the cooperating section of lip 45, appreciable transverse offset may be accommodated without reducing the effectiveness of the joint. This quality is considered extremely important with respect to effecting compensation for aircraft structure flexing.

In the case of removable and replaceable conduit sections such as 12 and 14, the direction of engagement of the conduit section and seal portions to each other is in a transverse direction relative to the longitudinal axis of such sections. In such cases the seal piston must make contact with the lip portion 45 of seat 24. In the case of a conduit section such as 13, joints 22 may be established by tangential engagement of the joint portions relative to each other. Such engagement also preferably involves the use of a lip on seal seat 24.

It is to be understood that the forms of the invention herewith shown and described are to be taken as preferred embodiments of the same, but that various changes in the shape, size, number, and arrangement of parts may be resorted to without departing from the spirit of the invention or the scope of the subjoined claims.

I claim:
1. An aircraft conduit construction comprising:
 (a) A first conduit section having a longitudinal axis,
 (b) A separate conduit section which constitutes an extension of said first conduit section when aligned and connected therewith and which has a longitudinal axis,
 (c) Seal seat means fixedly connected to said first conduit section in sealing relation and having a generally annular flat end seal face which is oriented normal to said first conduit section longitudinal axis and a ramp surface which intersects and is oriented obliquely to said end seal face, and
 (d) Spring-urged seal piston means slidably contacting said separate conduit section in sealing relation and having a flat annular end lip oriented normal to said separate conduit section longitudinal axis and projected beyond the adjacent end of said separate conduit section,
said seal piston means annular end lip contacting said seal seat means ramp and being moved angularly and longitudinally of said separate conduit section longitudinal axis and into contacting relation to said seal seat means end seal face as said conduit sections are moved into an aligned and connection relation by relative movement of said conduit sections in a direction transverse to said longitudinal axes, and said seal seat means having an annular cavity formed in the face of said seal seat means which is opposite said end seal face, the radial width of said cavity being at least equal to the radial width of said seal piston means annular end lip, to thereby form a thin flexible wall that is engaged by and deformed into sealing relation with said seal piston means annular end lip.

2. The invention defined by claim 1, wherein said conduit construction is provided with a resilient packing, said resilient packing being positioned within said seal seat means annular cavity in resilient urging relation to said seal seat means thin flexible wall.

References Cited by the Examiner

UNITED STATES PATENTS

| 2,233,599 | 3/1941 | Gilbert | 285—375 X |
| 2,923,567 | 2/1960 | Jones | 285—26 X |
| 3,055,620 | 9/1962 | Weiland | 244—135 |
| 3,115,352 | 12/1963 | Heerlein | 285—9 |

FOREIGN PATENTS

| 582,013 | 10/1924 | France. |
| 972,884 | 9/1950 | France. |
| 258,408 | 4/1913 | Germany. |

CARL W. TOMLIN, *Primary Examiner.*

R. A. GIANGIORGI, *Assistant Examiner.*